United States Patent

Logvinenko

[15] 3,691,130

[45] Sept. 12, 1972

[54] METHOD OF PRODUCING METAL-POLYMER COMPOSITIONS

[72] Inventor: Dmitry Danilovich Logvinenko, ulitsa Kalinina, 5, kv. 5, Poltava, U.S.S.R.

[22] Filed: Aug. 6, 1970

[21] Appl. No.: 61,864

[52] U.S. Cl. ................... 260/41 B, 241/1, 260/37 M, 264/24
[51] Int. Cl. ....................... C08f 45/04, C08g 51/04
[58] Field of Search....241/1, 5; 264/22, 24, DIG. 58; 252/62.54; 260/41 B

[56] References Cited

UNITED STATES PATENTS

| | | | |
|---|---|---|---|
| 2,849,312 | 8/1958 | Peterman | 264/24 |
| 3,051,988 | 9/1962 | Baerman | 264/22 |
| 3,070,841 | 1/1963 | Schornstheimer | 264/22 |
| 3,564,705 | 2/1971 | Cochardt | 264/24 |

*Primary Examiner*—Lewis T. Jacobs
*Assistant Examiner*—P. R. Michl
*Attorney*—Waters, Roditi, Schwartz & Nissen

[57] ABSTRACT

The present invention relates to method of producing metal-polymer compositions.

The method of the invention is characterized in that a polymer medium which contains a metal component in the form of ferromagnetic particles or a mixture thereof with non-ferromagnetic metal particles is affected by a travelling rotating electromagnetic field.

From the metal-polymer compositions thus produced various articles can be manufactured, featuring high mechanical characteristics.

15 Claims, No Drawings

METHOD OF PRODUCING METAL-POLYMER COMPOSITIONS

The present invention relates to methods of producing metal-polymer compositions based upon synthetic polymers with finely dispersed metal particles spread thereamong.

The invention has particular reference to methods of obtaining metal-polymer compositions based upon polyamids, polytetrafluoro-ethylene, epoxy resins, or synthetic rubber by introducing powdered chromium-nickel alloyed steels, cast irons, various metal alloys, metal oxides and pure metals thereinto.

There are known at present some methods of obtaining metal-polymer compositions by way of mechanically intermixing an dispersing metal particles in a polymer medium effected in ball or colloid mills and mixers (cf. USSR Author's Certificate No. 136,556). However, such a method fails to provide an adequate distribution of metal particles in the polymer medium even when being mixed for a lengthy period of time; besides, this method in incapable of providing metal-polymer compositions containing metal particles as small as tenths and hundredths of a micron.

Some other methods were proposed, whereby highly dispersed metal particles are shaped in the polymer medium by the method of electrolysis. According to said method a metal-polymer is obtainable in a double-layer electrolysis bath by dispositing colloidal metal upon a rotating cathode. The method is described in USSR Author's Certificate No. 209,731.

A disadvantage inherent in the above method resides in failure to obtain metal-polymer compositions based upon such metals as aluminum, magnesium, calcium, potassium, as well as upon various alloys, steels, and cast irons.

One more method has been proposed, wherein a metal-polymer composition has resulted from a thermal reduction in a vacuum of organic compounds adequately spread in the polymer medium (cf. Transactions of the USSR Academy of Sciences, Vol. 167, No. 1).

A disadvantage of the above method lies with the polymer being thermally decomposed and failure to obtain compositions based upon metal alloys.

A common disadvantage inherent in all the above-discussed methods is the involving of complicated and highly expensive equipment and apparatus.

It is an object of the present invention to provide a method of obtaining metal-polymer compositions that would involve a relatively simple but efficient equipment and apparatus and would be capable of obtaining uniformly spread dispersed particles of metals or alloys in the polymer medium, as well as of dispersing said metal or allow particles immediately in the polymer medium.

Said object is accomplished due to the provision of a method which, according to the present invention, consists in that the polymer medium containing a metal component in the form of ferromagnetic particles, is affected by a travelling rotating electromagnetic field which captures ferromagnetic particles of the metal component and imparts intense compound motion and magnetostrictive oscillation thereto.

At the same time the polymer component of the composition is exposed to the effect of a travelling electromagnetic field and acoustical waves, this being due to the fact that each of the ferromagnetic particles is in effect a source of such vibrations or waves. It is under the effect of the aforedescribed factors that the ferromagnetic particles are intensely disintegrated from 0.15–15 mm down to $10^{-4}$–$10^{-7}$ cm.

It is expedient that the value of the magnetic induction of a travelling rotating electromagnetic field in the polymer medium that contains said metal component, be at least 0.1 tesla.

Used as ferromagnetic particles are particles of pure ferromagnetic metals or alloys thereof such as iron, nickel, cobalt, steel, cast iron, and the like.

According to one of the embodiments of the present invention the essence thereof may consist in that a travelling rotating electromagnetic field affects the polymer medium containing a metal component which is in effect a mixture of ferromagnetic and non-ferromagnetic metal particles. In this case the non-ferromagnetic metal particles are liable to disperse to those of colloidal size and to equally spread in the polymer medium with the help of ferromagnetic particles that serve as stirring and disintegrating bodies.

It is also recommended that the ferromagnetic particles serving as stirring and disintegrating bodies, be coated with a protective polymeric film, this being particularly important for those cases where it is necessary to obtain metal-polymer compositions containing non-ferromagnetic metal component and free from ferromagnetic inclusions.

It is likewise desirable that said ferromagnetic particles be coated with polytetrafluoro-ethylene protective film.

In case of the use of a mixture of ferromagnetic and non-ferromagnetic particles, the former particles may be made a unequiaxed bodies and be expediently imparted cylindrical shape, this contributing to a more effective spread thereof.

When carrying the method of the invention into effect, said polymer medium can be in liquid or powdered state.

Exemplary polymer media employed for obtaining metal-polymer compositions are polytetrafluoro-ethylene, polyamid, epoxy resin, phenol-formaldehyde resin.

The herein disclosed method features a number of advantages over the hitherto known ones. It enables the obtaining of metal-polymer compositions based upon synthetic rubber, epoxy resins, polytetrafluoro-ethylene and some other polymers with adding colloidal and powdered metal, e.g., iron, aluminum, grey cast iron, copper, lead, chromium-nickel alloys, and the like, as well as a system based upon various polymers and metal oxides. The application of the present method considerably simplifies the production technique of metal-polymer materials and involves no complicated and expensive equipment and apparatus. Besides, the process of dispersion proceeds continuously and is readily liable to be fully automated.

Furthermore, the proposed method makes it possible to disintegrate within a relatively short period of time and immediately in polymeric substances, the necessary amount of metal down to particles possessing colloidal size (viz. 0.1 to 0.001 mk). Formation of such particles immediately within the polymer medium is conducive to a substantial improvement in a number of the properties of metal-polymer materials, as well as to the development of new such materials due to formation of irreversible adsorption linkages between the macromolecules of polymers and colloidal particles of metals.

Materials obtained on the base of metal-polymer compositions having passed electromagnetic treatment, need no epuration from alien inclusions adversely affecting the quality thereof.

The method enables the particles of powderlike metal fillers to be adequately and quickly spread in the polymer medium at a mixing rate 500–1,500 times as high as compared to the early methods.

A device for carrying the method of the invention into effect is very simple in construction being essentially a vessel or receptacle made from nonmagnetic, nonconductive material such as nucerite and provided with inlet and outlet pipes for primary components to charge and discharge, respectively. The container is placed in a generator of electromagnetic rotating field.

Then a necessary amount of unequiaxed ferromagnetic particles are charged into the container, such as nickel, steel, cobalt, cast-iron particles, as well as a powder or suspension or else a solution of a polymer, or a liquid polymer, that is, polymer medium in which ferromagnetic component is to be dispergated and equally spread. The amount of the metal component to be charged depends on the desired properties of the final product to obtain.

Under the effect of the rotating electromagnetic field produced by the generator the metal ferromagnetic particles perform compound intense motion, i.e., rotation about their least axis at a speed nearly equal to rotation speed of the field, translational and oscillating motions, as well as magnetostrictive oscillations (magnetic induction effective within the dispergation zone being at least 0.1 tesla).

At the same time the non-ferromagnetic (polymeric) component of the composition is subjected to the effect of a travelling electromagnetic field and acoustical waves, this being due to the fact that each of the ferromagnetic particles is in fact a point-source radiator of such waves or vibrations.

Thus, all the components are caused to intensely moved and intermixed.

Under the effect of all the afore-listed factors the ferromagnetic metal particles are vigorously superficially disintegrated from 0.15–15 mm down to $10^{-4}$–$10^{-7}$ cm.

The surface of the newly formed metal particles possesses high activity, whereby there arise irreversible adsorption linkages between the metal colloidal particles and the molecules of polymer resulting in appearing new properties of a metal-polymer compositions.

Should necessity arise of dispersing non-magnetic metal particles to the particles of colloidal size, the container of the apparatus is charged with the particles of a ferromagnetic metal along with the non-magnetic particles sizing 0.5–5 mm each, the ratio between the amounts of the ferromagnetic and non-magnetic particles ranging from 1:1 to 1:100. In this case both ferromagnetic and non-magnetic metal particles are dispergated to colloidal size, the dispergating of non-magnetic particles being prodiminant.

With the polymer continuously passing through the container only the colloidal metal particles are captured thereby, whereas the primary ferromagnetic metal particles of larger size are retained by the electromagnetic field against being entrained by the flow of polymer.

The present method is applicable for an adequate distribution in the polymer a ready dispersive metal powder and other powdered non-metallic fillers. The time and degree of intermixing by the present method are found in Table 1 below.

TABLE 1

| Experiment No. | Components being intermixed | Weight percentage of components | Acc. to the present method | | By conventional mechanical methods | |
|---|---|---|---|---|---|---|
| | | | Mixing time, sec. | Mixing degree, percent | Mixing time, hrs. | Mixing degree, percent |
| 1 | Polycarbonate | 99 | 25 | 99.0 | 4.5 | 98.5 |
| | Titanium dioxide | 1 | | | | |
| 2 | Polycarbonate | 99.8 | 12 | 98.5 | 4.5 | 97.6 |
| | Powdered aluminium | 0.2 | | | | |
| 3 | Polytetrafluoro-ethylene | 87 | 15 | 99.1 | 8 | 96.4 |
| | Powdered nickel | 10 | | | | |
| | Molybdenum disulphide | 3 | | | | |
| 4 | Polytetrafluoro-ethylene | 87 | 15 | 99.1 | 8 | 96.2 |
| | Powdered nickel | 10 | | | | |
| | Graphite | 3 | | | | |
| 5 | Polyamid | 99 | 15 | 98.8 | 5 | 97.5 |
| | Powdered nickel | 1 | | | | |
| 6 | Novolac phenol-formaldehyde resin | 90 | 60 | 99.8 | 5 | 98.2 |
| | Powdered aluminium | 10 | | | | |

The thus-obtained compositions are then reprocessed into finished products by conventional techniques.

The examples cited hereinbelow are to further illustrate the specific and preferred embodiments of the present invention. However, it should be understood that the scope of the invention is by no means restricted to said examples.

Given below are some examples of obtaining metal-polymer compositions based upon polytetrafluoroethylene, epoxide resin, synthetic rubber, polyamid, and some results of varying the mechanical properties of materials made from said compositions.

All the compositions disclosed hereinbelow have been obtained in an apparatus featuring the following technical characteristics: the value of magnetic induction effective within the working zone of the apparatus — 0.13 tesla; rotational speed of the electromagnetic field — 3000 rpm.

EXAMPLE 1 a. A mixture comprising 100 g of polytetrafluoroethylene and 300 g of steel (weight percentage composition: C — 1; Cr — 18; Ni 13 9; Ti — 1; Fe — 71) in the form of cylindrical-shaped particles 6–7 mm long and 1.2 mm in diameter, has been exposed to rotating electromagnetic field in the presence of ethyl alcohol, the process of dispersing said mixture lasting 20 min.

b. Another mixture has been obtained due to dispergating the particles of said steel component in an amount of 300 g in ethyl alcohol within 15 min under the effect of rotating electromagnetic field, whereupon 100 g of polytetrafluoro-ethylene have been added, and the resultant mixture has been treated within 5 min.

Thereupon, the solid phase (both in variants a and b) has been isolated from the alcohol fraction by filtering and then dried at 100–120°C during 24 hrs. The dried mixture has been pressed and caked separately for the variants a and b at 360°–390°C and a compression moulding pressure of 300–350 kg/cm$^2$, the speed of the patrix being 6–7 cm/min and injection boost time, 2–3 min. Caking occured in an oven and without compression mould. Then the specimens have been heat treated at 390°C during 4 hrs and then oven-cooled down to 200° C during 1.5 to 2 hrs, whereupon the specimens have been taken from the oven to be air-dried. Two final products have been obtained, viz., polytetrafluoro-ethylene with 0.05 percent content of colloidal steel (variant a) and that with 0.45 percent content of colloidal steel (variant b).

Physico-mechanical and electrical characteristics and properties of the materials obtained are present in Table 2 below.

TABLE 2

| Physico-mechanical and electrical characteristics | pure polytetrafluoro-ethylene | polytetrafluoro-ethylene with 0.05 pct steel content | polytetrafluoro-ethylene with 0.45 pct steel content |
|---|---|---|---|
| Tensile strength, kg/cm$^2$ | 233 | 252 | 279 |
| Ultimate elongation, percent | 275 | 287 | 293 |
| Brinell hardness, kg/cm$^2$ | 5.05 | 5.59 | — |
| Surface resistivity, ohm | 4.3.10$^{16}$ | 9.10$^{16}$ | 4.3.10$^{16}$ |
| Volume resistivity, ohm.cm | 2.4.10$^{16}$ | 2.3.10$^{16}$ | 2.3.10$^{16}$ |
| Dielectric power factor at 10$^6$ cps | 0.0005 | 0.0005 | 0.0007 |
| Permittivity at 10$^6$ cps | 2.0 | 2.0 | 2.1 |

As it can be seen from the above table the introduction of stainless colloidal steel into the powdered polytetrafluoroethylene brings about an effective increase in the mechanical characteristics thereof.

EXAMPLE 2

A mixture composed of 500 g of epoxy resin with a percentage content of epoxy groups equal to 18,35 g of powdered aluminum (particles 0.5–2.5 mm in diameter) and ferromagnetic particles (steel), is heated up to 80°C by placing in rotating electromagnetic field.

The process of dispersing the metal particles takes 5 min.

The product obtained is allowed to settle for 24 hrs at 20°C. The resultant composition contains 0.02 percent of colloidal aluminum, determined by a chemical analysis.

In the obtained composition there are added 15 weight percent of polyethylene-polyamine, the mixture is dispensed to moulds and subjected to polymerization at 20°C. The mechanical properties of the final product is indicated in Table 3 below.

TABLE 3

| | |
|---|---|
| 1. Modulus of elasticity, kg/cm$^2$ | 0.032.10$^6$ |
| 2. Compression strength, kg/cm$^2$ | 1060 |
| 3. Unit strain at static bending | 21.9.10$^{-3}$–23.10$^{-3}$ |

EXAMPLE 3

A mixture comprising 500 g of epoxy resin as used in the precedent example, and 50 g of cast iron chips 1–5 mm in size is heated up to 80°C and placed in rotating electromagnetic field.

The dispersing process lasting 5 minutes, the sol of cast iron is drained off. Large-sized particles of cast iron are retained by the magnetic field. The resultant composition contains 0.047 weight percent of colloidal cast iron.

The production technique of the specimens is the same as in Example 2.

The mechanical properties of the material obtained as a result of polymerization of the metal-polymer composition, are present in Table 4 below.

TABLE 4

| | |
|---|---|
| 1. Modulus of elasticity, kg/cm$^2$ | 0.033.10$^6$ |
| 2. Compression strength, kg/cm$^2$ | 986 |
| 3. Unit strain at static bending | 10.8.10$^{-3}$ |

EXAMPLE 4

A mixture of 50 g of liquid rubber, 10 g of epoxy resin, 1.5 g of triethanolamine and 200 g of stainless steel particles the same as in Example 1 (6–7 mm long and 1.2 mm in diameter), is heated up to 60°C, whereupon is placed in rotating electromagnetic field.

Dispersing of steel and intermixing of components in electromagnetic field takes 5 minutes.

The resultant product is dispensed to moulds and kept in a thermostat within 30 hrs at a temperature of 80°C±3°C. After the polymerization process has been over, standard specimens are to be made to test for the mechanical properties thereof. The final product contains 0.02 percent of colloidal steel.

Mechanical characteristics of the materials containing 0.02 percent of colloidal steel and free from it are stated in Table 5 below.

TABLE 5

| Mechanical characteristics | Specimen free from colloidal steel | Specimen containing 0.02 percent of colloidal steel |
|---|---|---|
| 1. Ultimate elongation, percent | 445 | 810 |
| 2. Permanent elongation, percent | 4 | 18 |
| 3. Tensile strength, kg/cm$^2$ | 23.2 | 21.0 |

EXAMPLE 5

A mixture composed of 100 g of polytetrafluoro-ethylene and 100 g of steel the same as stated for Example 1 above in the form of cylindrical-shaped particles 6–7 mm long and 1.2 mm in diameter, is placed in rotating electromagnetic field, wherein the metal component of the mixture is subjected to dispersing down to colloidal size within 45 minutes. Then specimens are made from the obtained product by resorting to the technique described above with reference to Example 1.

As a result a metal-polymer composition is obtained based upon polytetrafluoro-ethylene with a 2.2 percent content of colloidal steel, the physico-mechanical properties of said material being given in Table 6 below.

TABLE 6

| | |
|---|---|
| Tensile strength, kg/cm$^2$ | 95 |
| Ultimate elongation, percent | 37 |
| Brinell hardness, kg/mm$^2$ | 5.82 |

EXAMPLE 6

A mixture comprising 100 g of polytetrafluoro-ethylene and 100 g of nickel particles 5–7 mm long and dia. 1 mm each, is placed in rotating electromagnetic field, the experiment having been repeated a few times at different duration of exposition to electromagnetic field. The product obtained undergoes pressing and heat treatment as per the technique described with relation to Example 1. Data on the influence of dispersing conditions upon the physico-mechanical properties of the compositions of polytetrafluoro-ethylene with colloidal nickel are quoted in table 7 below.

TABLE 7

| Physico-mechanical properties of polytetrafluoro-ethylene in combination with colloidal nickel | Duration of treatment in electromagnetic field, min | | |
|---|---|---|---|
| | 2 | 5 | 10 |
| 1. Tensile strength, kg/cm$^2$ | 133 | 112 | 96 |
| 2. Ultimate elongation, percent | 132 | 57 | 50 |
| 3. Brinell hardness, kg/mm$^2$ | 4.23 | 3.4 | 2.23 |
| 4. Colloidal nickel content, percent | 0.03 | 0.09 | 0.15 |

EXAMPLE 7

A mixture composed of 180 g of polytetrafluoro-ethylene and 20 g of aluminum powder is placed in the active zone of rotating electromagnetic field in the presence of ferromagnetic particles protected with polytetrafluoro-ethylene coating. As a result polytetrafluoro-ethylene composition is obtained possessing different physico-mechanical characteristics.

The data on the influence of the mixing conditions upon the physico-mechanical properties of the compositions of polytetrafluoro-ethylene with a 10 percent aluminum concent are present in Table 8 below.

TABLE 8

| Physico-mechanical properties of polytetrafluoro-ethylene with 10 percent aluminum content | Duration of treatment, sec | |
|---|---|---|
| | 30 | 60 |
| 1. Tensile strength, kg/cm$^2$ | 108 | 114 |
| 2. Ultimate elongation, percent | 57 | 48 |

It should be pointed out that due to polytetrafluoro-ethylene having fibrous structure and being readily liable to get lumpy when exposed to cold, it is impossible to obtain a uniform mixture with a 10 percent of powdered aluminum content when employing paddle-, drum-, vibration-type mixers and those of the colloid-mill type on account of the material becoming exfoliated when caked. By using the method in contemplation it is possible to obtain a material with the aluminum content even in excess of 10 percent.

EXAMPLE 8

A mixture comprising 180 g of polytetrafluoro-ethylene and 20 g of powdered nickel, is placed within the active zone of rotating electromagnetic field in the presence of ferromagnetic particles protected with polytetrafluoro-ethylene coating to stay there for 30 and 60-sec lapses of time, the treatment technique being the same as described for Example 7.

Data on the influence of the component intermixing conditions upon the physico-mechanical properties of polytetrafluoro-ethylene containing 10 weight percent of powdered nickel, are present in Table 9 below.

TABLE 9

| Physico-mechanical properties of polytetrafluoro-ethylene with a 10-weight percent content of powdered nickel | Duration of treatment in electromagnetic field, sec | |
|---|---|---|
| | 30 | 60 |
| 1. Tensile strength, kg/cm$^2$ | 147 | 145 |
| 2. Ultimate elongation, percent | 202 | 165 |
| 3. Brinell hardness, kg/mm$^2$ | 4.71 | 4.41 |
| 4. Aluminum content, percent | 10 | 10 |

EXAMPLE 9

A mixture composed of 14 g of pulverbakelite (finely divided mixture of novolac phenol-formaldehyde resin with 7.4 percent of urotropine), 126 g of powdered aluminum and steel particles (dia. 0.7 mm and 6–7 mm long), is placed in rotating electromagnetic field within 1 minute, the adequateness of spreading the components in the mixture being determined by way of chemical analysis of the samples taken from different parts of the mixture.

The results of determining the adequateness of the component intermixing are tabulated in Table 10 below. Herein are also quoted (for the cake of comparison) the results of determining the adequateness of intermixing the components in a plant of the "rotating drum" type during 5 hrs.

TABLE 10

| Mixing by the proposed method | | | Mixing by the conventional method | | |
|---|---|---|---|---|---|
| Mixing time, hrs | Pulverbakelite content in the sample | Deviation from the mean per value cent | Maximum deviation from the range, per cent | Mixing time, hrs | Pulverbakelite content in the sample | Deviation from the mean value | Maximum deviation from the range, per cent |

| Mixing time, hrs | Pulverbakelite content in the sample | Deviation from the mean per value cent | Maximum deviation from the range, per cent | Mixing time, hrs | Pulverbakelite content in the sample | Deviation from the mean value | Maximum deviation from the range, per cent |
|---|---|---|---|---|---|---|---|
| 0.017 | 9.99 | −0.05 | 1.06 | 5 | 9.93 | +0.06 | 1.85 |
| | 10.04 | 0.00 | | | 9.75 | −0.12 | |
| | 10.02 | +0.02 | | | 9.93 | +0.06 | |
| | 10.10 | +0.06 | | | 9.88 | −0.01 | |

EXAMPLE 10

A mixture containing 180 g of polytetrafluoro-ethylene, 20 g of powdered nickel and 300 ml of ethyl alcohol is introduced for different periods of time into the active zone of rotating electromagnetic field in the presence of ferromagnetic particles protected with polytetrafluoro-ethylene coating.

Then the solid phase is isolated through the filtering under a vacuum-pump, the preparation technique of a composition from polytetrafluoro-ethylene with a 10 percent nickel content is similar to that described with reference to Example 1.

Data on the influence of the mixing conditions upon the physico-mechanical properties of the metal-polymer composition obtained are found in Table 11 below.

TABLE 11

| Physico-mechanical properties of polytetrafluoro-ethylene with a 10-percent nickel content when mixing in the ethyl alcohol medium | Duration of mixing in electromagnetic field, sec | |
|---|---|---|
| | 30 | 60 |
| 1. Tensile strength, kg/cm² | 156 | 146 |
| 2. Ultimate elongation, percent | 152 | 145 |
| 3. Brinell hardness, kg/mm² | 5.14 | 5.14 |

What is claimed is:

1. A method of obtaining metal-polymer compositions wherein a polymer medium which contains a metal component including ferromagnetic particles, is affected by travelling rotating electromagnetic field of at least 0.1 tesla magnetic induction whereby said metal component is disintegrated and adequately spread in said medium.

2. A method as claimed in claim 1, wherein the metal component is ferromagnetic particles.

3. A method as claimed in claim 1 wherein said metal component is a mixture of ferromagnetic and non-ferromagnetic metal particles.

4. A method as claimed in claim 3, wherein the ferromagnetic particles are coated with a protective polymeric film.

5. A method as claimed in claim 4, wherein the ferromagnetic particles are coated with a protective polytetrafluoro-ethylene film.

6. A method as claimed in claim 3, wherein use is made of unequiaxed ferromagnetic particles.

7. A method as claimed in claim 6, wherein use is made of cylindrical-shaped ferromagnetic particles.

8. A method as claimed in claim 1, wherein said polymer medium is in liquid state (liquid polymer).

9. A method as claimed in claim 1, wherein said polymer medium is in solid powderlike state.

10. A method as claimed in claim 1, wherein polytetrafluoro-ethylene is employed as a polymer medium.

11. A method as claimed in claim 1, wherein epoxide resin is employed as a polymer medium.

12. A method as claimed in claim 1, wherein no Volac phenol-formaldehyde resin is employed as a polymer medium.

13. A method as claimed in claim 1, wherein polyamide is employed as a polymer medium.

14. A method as claimed in claim 1, wherein the particles of ferromagnetic metals are employed as ferromagnetic particles.

15. A method as claimed in claim 1, wherein the particles of ferromagnetic metal alloys are employed as ferromagnetic particles.

* * * * *